INVENTOR.
LYNN L. CHARLSON
BY Robert W. Doyle
ATTORNEY

Dec. 15, 1970    L. L. CHARLSON    3,547,563
FLUID OPERATED MOTOR
Filed Dec. 31, 1968    3 Sheets-Sheet 2
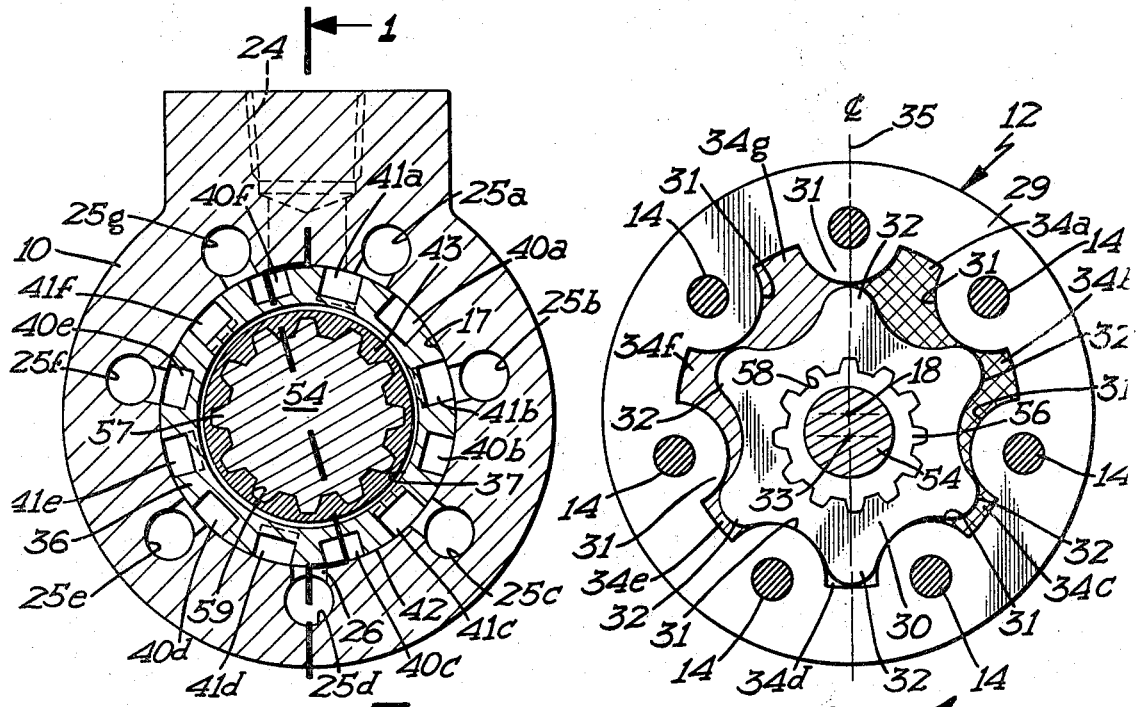
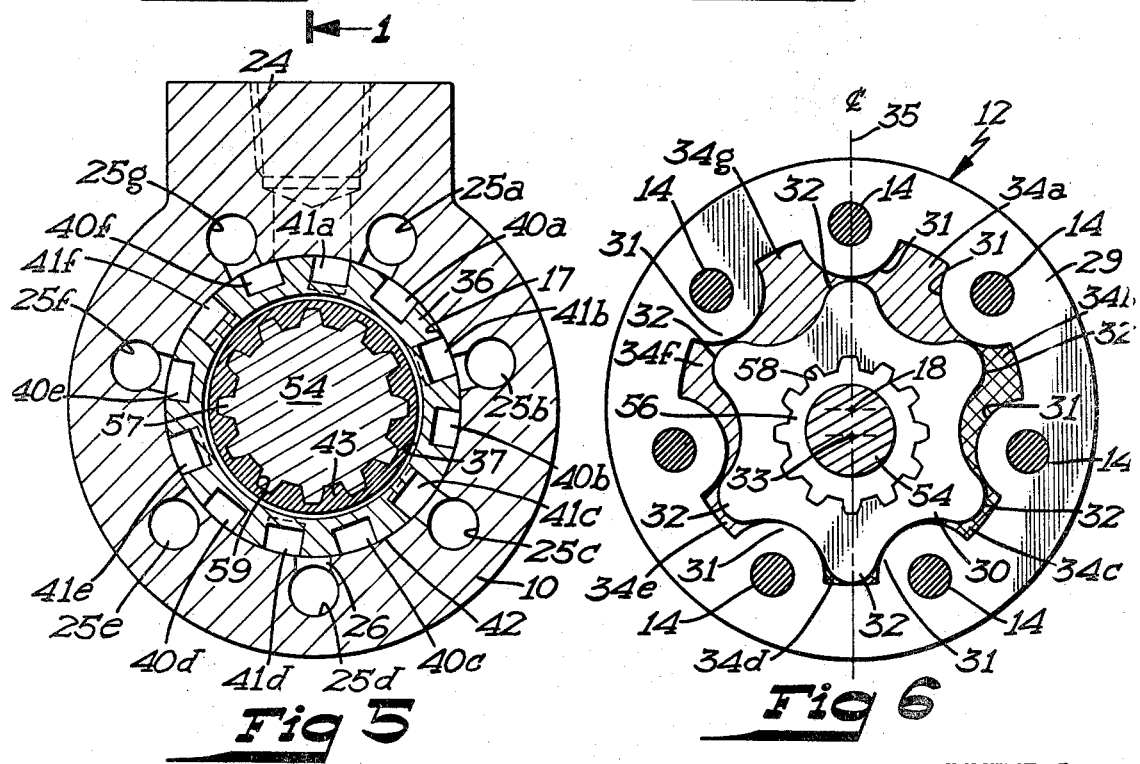
INVENTOR.
LYNN L. CHARLSON
BY Robert W. Doyle
ATTORNEY INVENTOR.
LYNN L. CHARLSON
BY Robert W. Doyle
ATTORNEY

United States Patent Office 3,547,563
Patented Dec. 15, 1970

3,547,563
FLUID OPERATED MOTOR
Lynn L. Charlson, St. Louis Park, Minn., assignor to Germane Corporation, Minneapolis, Minn., a corporation of Minnesota
Filed Dec. 31, 1968, Ser. No. 788,274
Int. Cl. F01c 1/04
U.S. Cl. 418—61                                     4 Claims

ABSTRACT OF THE DISCLOSURE

A reversible fluid operated motor of the axial valve type, wherein the valve is driven by the output shaft, but takes its alignment from the housing, wherein the output shaft is supported in the housing independent of the valve, and wherein the valve is timeable providing optimum operation in a predetermined direction of shaft rotation.

---

This invention relates to a fluid operated motor of the axial valve type and, more particularly, to a fluid operated motor of the reversible type having a valve timeable for optimum performance in a reversible application as well as timeable for optimum performance in a predetermined direction of rotation.

Fluid operated motors heretofore known have had no provision for timing the motor for optimum performance in a predetermined direction of rotation. Motors provided have been designed to be reversible and have been timed accordingly for efficient operation in either direction of rotation. However, increased use of fluid operated motors and the growing applications therefor have clearly shown the need for an improved fluid operated motor timeable for specific applications. Motors heretofore available of the reversible axial valve type cannot be conveniently timed for a specific application and attempts at timing or changing the position of the displacement mechanism relative to the valve may result in an extremely inefficient operation or no operation at all. Further, it has been found that in application of a motor under load, backlash, wear and torsional effects cause a twisting of the drive connecting the displacement mechanism with the output shaft. This torsional effect results in retarding valve operation relative to the displacement mechanism destroying the synchronous operation therebetween.

With these comments in mind, it is to the elimination of these and other disadvantages to which the present invention is directed, along with the inclusion therein of other novel and desirable features.

An object of this invention is the provision of a fluid operated motor of simple and inexpensive construction and operation.

Another object of this invention is the provision of a reversible fluid operated motor of the axial valve type having a valve separate from the output shaft and timeable relative to the displacement mechanism whereby compensation may be provided for torsional deflection of the drive member connecting the displacement mechanism and valve through the output shaft.

Still another object of this invention is the provision of a reversible fluid operated motor of the axial valve type having a provision for timing the valve relative to the displacement mecanism compensating for drive deflection for the clockwise direction of shaft rotation, an alternate timing position for counter clockwise shaft rotation, a timing position for reversible rotation and alternate timing positions for less than capacity loads on the output shaft whereby optimum timing may be provided commensurate with the application of the fluid operated motor.

These and other objects and advantages of this invention will more fully appear from the following description made in connection with the accompanying drawings, wherein like reference character refer to the same or similar parts throughout the several views.

BRIEF DESCRIPTION OF THE DRAWINGS

In the drawings:
FIG. 3 is a sectional view taken along lines 3—3 of FIG. 1.
FIG. 4 is a sectional view taken along lines 4—4 of FIG. 1.
FIG. 5 is a sectional view taken along lines 3—3 of FIG. 1 but showing a maximum load condition on the valve.
FIG. 6 is a sectional view taken along lines 4—4 of FIG. 1 but showing the pressure and exhaust pattern of the displacement mechanism for full load corresponding to the valve portion of FIG. 5.
FIG. 8 is placed under load, it then reverts to the position of FIG. 3.

DESCRIPTION OF A PREFERRED EMBODIMENT

Figure 1:
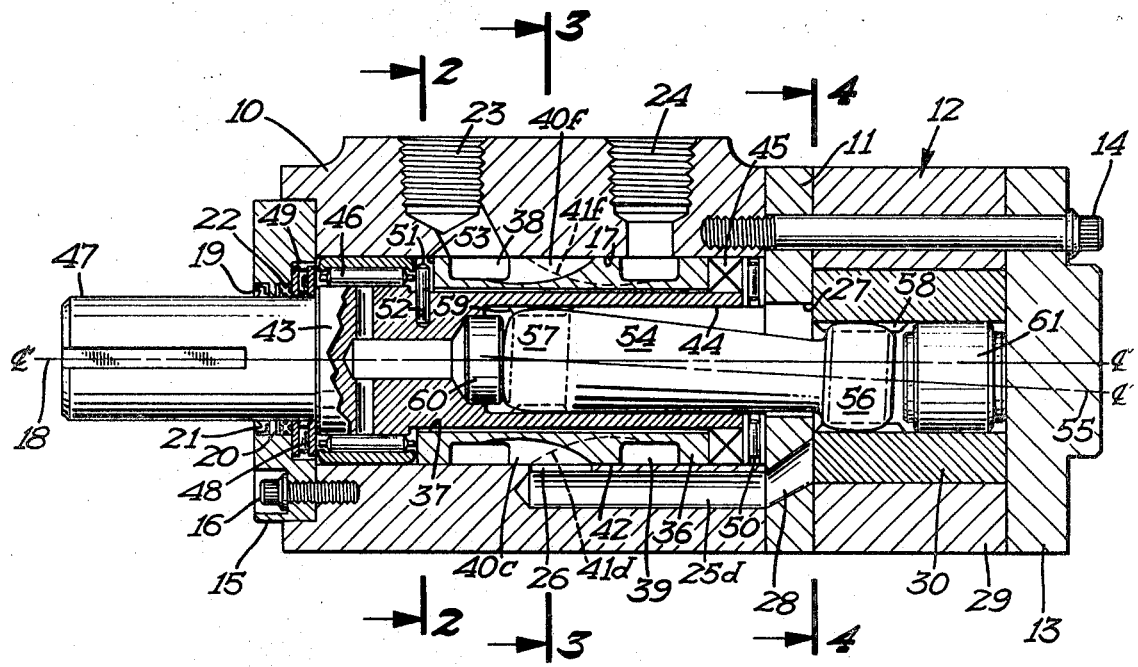
FIG. 1 is a longitudinal sectional view of the motor taken along the lines 1—1 of FIG. 3.

The fluid operated motor shown in FIG. 1 is generally cylindrically shaped and comprises several sections. A valve housing is indicated at 10. A valve plate section 11 is positioned adjacent valve housing 10, and an internal gear set section or gerotor set 12 is positioned adjacent valve plate section 11, sandwiching valve plate section 11 between valve housing section 10 and internal gear set section 12. An end cover plate 13 is positioned adjacent internal gear set section 12, sandwiching internal gear set section 12 between the end cover plate 13 and the valve plate section 11. A plurality of axially extending bolts 14 join the end cover plate 13 with gerotor set 12, valve plate section 11 and valve housing 10 forming a generally cylindrically shaped motor frame or body. Front cover plate 15 is assembled to housing 10 by a plurality of axially extending screws 16.

Valve housing 10 includes a valve receiving bore 17 extending axially thereof along the axis of the motor as indicated by the motor axis or housing centerline 18. Counterbores 19 and 20, concentric with bore 17, are provided to receive motor sealing assemblies 21 and 22 respectively in plate 15. Internally threaded ports 23 and 24 are provided in valve housing section 10 to conduct inlet fluid and exhaust fluid; depending upon the desired direction of rotation of the output shaft, one port would conduct inlet fluid, the other exhaust fluid. Ports 23 and 24 communicate with valve receiving bore 17. Valve housing section 10 also includes a plurality of axially extending and radially spaced fluid passages 25a, 25b, 25c, 25d, 25e, 25f and 25g. Each fluid passage 25a–25g includes an opening 26 providing fluid communication between fluid passages 25a–25g and valve receiving bore 17.

Valve plate section 11 includes bore 27, which is concentric with valve receiving bore 17 and housing centerline 18 of valve housing 10. Valve plate section 11 includes a plurality of angulated fluid receiving passages 28 corresponding in number and position and in fluid communication with the plurality of passages 25a–25g of valve housing section 10.

Referring now to internal gear set section 12, the construction thereof is best shown in FIG. 4. Gerotor set 12 comprises an external ring member 29 and mating internal star member 30. Ring member 29 has a plurality of internal teeth 31 and mating star member 30 has a plurality of external teeth 32 numbering one fewer than the number of internal teeth of ring member 29. Star member 30 is eccentrically disposed in ring member 29. Star member 30 orbits relative to ring member 29 about motor axis centerline 18 and rotates on its axis 33. During this orbital movement the external teeth 32 of the star member mesh with the ring member teeth in sealing engagement to form expanding and contracting cells 34a, 34b, 34c, 34d, 34e, 34f and 34g which are equal in number to the number of teeth of ring member 29, and in fluid communication with passages 28 in valve plate 11.

A line of eccentricity of the gerotor or internal gear set 12 is shown by centerline 35 and is defined as that line which passes through axis 33 of the star member 30 and axis 18 of ring member 29. The line of eccentricity constantly rotates during operation of the gerotor set and may be considered to separate the pressure side from the exhaust side of the gerotor set. During this rotation, however, the line of eccentricity always passes through axis 18 and axis 33. The star and ring members are typically constructed of hardened steel, although other materials may be used if desired.

Referring now to FIG. 3, a cylindrically shaped axial valve 36 having an outer diameter corresponding to the inner diameter of bore 17 is shown positioned in bore 17 of housing 10 in precision rotative fit relative thereto. Valve 36 is a commutating type valve and includes bore 37 therein adapted to receive a shaft substantially concentric therewith. Valve 36 includes a pair of annular and axially spaced ring grooves 38 and 39, positioned thereon whereby constant fluid communication is maintained between port 23 and annular ring groove 38 and port 24 and annular ring groove 39 respectively. A plurality of axially extending slots 40a, 40b, 40c, 40d, 40e and 40f extend from annular ring groove 38 whereby, in predetermined positions of valve 36 relative to valve housing 10, fluid communication is provided between slots 40a–40f and housing openings 26 and then to passages 25. Axially extending slots 41a–41f extend from annular ring groove 39, and are positioned between slots 40a–40f whereby communication with valve housing openings 26 is provided at predetermined intervals during the rotation of the valve relative to the housing. The valve rotates in synchronism with the rotation of star member 30 and slots 40a–40f (and slots 41a–41f) correspond in number to the number of teeth 32 of star member 30.

In the motor shown, star member 30 has six teeth 32 and, correspondingly, valve 36 includes six slots 40a–40f and six slots 41a–41f positioned therebetween. The valve rotates in bore 17 with valve surface 42 in precision fit therewith, providing the tightest fit possible, yet allowing the valve to rotate. The valve is typically constructed of hardened steel and rotates in the cast iron housing. Of course, other materials may be used and, in fact, there may be some advantages to using a bronze sleeve in the housing in which the valve would rotate.

Output shaft 43, typically constructed of hardened steel, includes bore 44 and is assembled in valve receiving bore 17 of valve housing 10, supported therein by rear sleeve bearing 45 and front roller bearing 46. Output shaft 43 is substantially concentric within valve bore 37 and has an outside diameter less than the diameter of bore 37 by about two percent. Rear and front bearings 45 and 46, respectively, have outside diameters substantially equal to the diameter of bore 17 and a press fit therebetween is utilized to assemble the bearings in the housing. It should be noted that commercially available bearings do not have tolerances necessary to maintain the alignment of the shaft in the bearings in the same high degree of alignment that can be obtained for the alignment of the valve within the housing from precision machining. This fact greatly increases the need for separating the shaft from the valve whereby the valve does not take its alignment from the shaft; but rather from the housing in which way greater fit therebetween can be effected, greatly reducing the leakage paths surrounding the valve during its rotation within the housing.

Output shaft 43 includes a journalled output portion 47 adapted to receive a suitable mechanism to be driven by the shaft. A front thrust bearing assembly 48 abuts shoulder 49 of front plate 15 and is sandwiched between the shoulder and front roller bearing 46. A rear thrust bearing 50 is assembled in bore 17, and is sandwiched between bearing 45 and valve plate 11.

Figure 2:
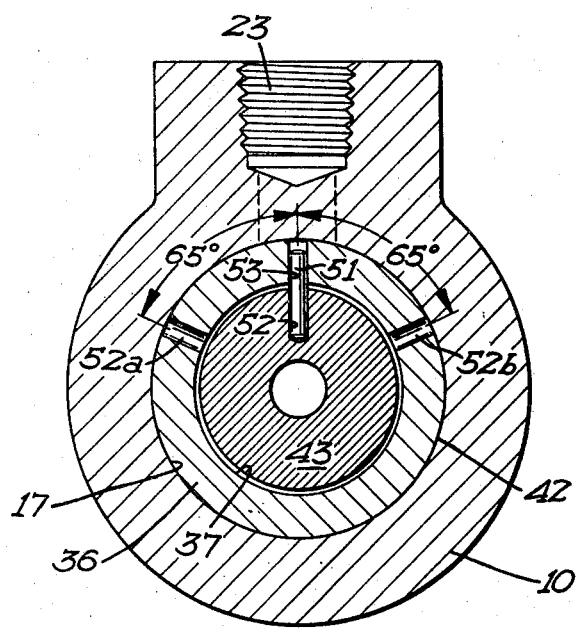
FIG. 2 is a sectional view taken along lines 2—2 of FIG. 1.

The valve is joined to the shaft by a connecting pin 51. Connecting pin 51 projects radially outwardly from output shaft 43 and slot 52, and is received in slot 53 in valve 36. Pin 51, if desired, may be sized and used as a shear pin. If the valve jams relative to the housing, the pin will shear, separating the driving shaft from the driven valve, stalling the motor and preventing further damage to the components. It should be noted that slot 53 allows for axial movement of connecting pin 51 relative to valve 36, thereby preventing any misalignment of output shaft 43 in valve housing 10 from affecting the axial alignment of valve 36. Referring to FIG. 2, slot 52a in valve 36 is shown counter clockwise 65° from slot 53 and 52b is shown clockwise 65° from slot 53 providing for timing correction corresponding to 5° accumulated error from torsion effects on the drive at a predetermined load, backlash or lack of tolerance in machined parts and wear of moving parts in the drive train.

A drive member 54 constructed of hardened steel joins output shaft 43 with the gerotor set 12 by connection to the star member 30. This drive member is elongate, having its axis 55 oriented generally along motor axis 18, but at a slight angle thereto to accommodate the eccentricity of star member 30 relative to ring member 29. Drive member 54 is always in this slightly angulated position relative to motor axis 18 as it functions during operation of the motor. Drive member 54 includes rear head element 56 and front head element 57. Rear and front head elements 56 and 57 have frustospherically shaped splines which are equal in number to and mesh with corresponding rear internal splines 58 in star member 30 and front internal splines 59 in shaft bore 44. Since drive member rear head element 56 is positioned in star member 30 which rotates and orbits, this end has both orbiting and rotational movement. However, drive member front head element 57 is positioned in output shaft 43 and rotates only. The frustospherically shaped heads and the spline connections function as a type of universal joint which allows this movement for drive member 54, providing means to cancel the orbiting motion of the star, translating only the rotating motion thereof. The star rotates at the same r.p.m. as the valve, the shaft and the drive member. However, the star orbits six times about motor axis 18 for each revolution of the star about its own axis.

A drive member positioning ring 60 is located in bore 44 of output shaft 43 and rotates therewith retaining drive member 54 in proper position relative to star member 30 and output shaft 43. An additional drive member positioning ring 61 is assembled within splines 58 of star member 30.

DESCRIPTION OF OPERATION

Since the general operation of a fluid operated axial valve motor is well known in the art, it will be discussed only briefly herein for purposes of more completely describing the operation of the invention.

Fluid under pressure, for example oil, enters port 23 and is conducted to annular groove 38 in valve member 36. The fluid under pressure is then conveyed through predetermined of slots 40 into corresponding openings 25 in housing 10. Passages 25 are in fluid communication with predetermined cells 34 in gerotor mechanism 12, with valve plate 11 and its corresponding openings 28, positioned between displacement mechanism 12 and valve housing 10 with openings 28 in fluid communication with corresponding passages 25 in the valve housing. Fluid under pressure is conveyed to cells 34 on one side of line of eccentricity 35, causing the gerotor star member to rotate and orbit.

Drive member 54 connects output shaft 43 with star member 30 and the rotational movement of the star member is transmitted to the output shaft by the drive member. Valve member 36 is connected to shaft 43 by drive pin 51 and the valve rotates in synchronism with the star member. A commutator action is thereby established and fluid under pressure is conveyed to cells 34 in a predetermined pattern. Simultaneously, fluid is exhausted from the cells on the opposite of line of eccentricity 35 through passages 28 in valve plate 11 and then through appropriate passages 25 in housing 10. The exhaust fluid ultimately passes through predetermined openings 26 into exhaust fluid slots 41 to be ultimately exhausted through annular groove 39 which is in fluid communication with port 24. As long as fluid is provided to inlet port 23, this operation is sustained and power may be taken off at output shaft 43.

Referring to FIGS. 3 and 4, a motor is shown with the timing established for reversible operation or optimum timing in either direction of rotation. The displacement mechanism is shown with the pressure and exhaust pattern under a no load condition or under a load condition compensated for losses such as backlash, wear and torsional load effects on the drive member. For most efficient operation of the displacement mechanism, and consequently the overall operation of the motor, the exhaust fluid is timed for cells 34a, 34b and 34c; cell 34d is neutral and cells 34e, 34f and 34g are timed for fluid under pressure. The pressure pattern shown in FIG. 4 is a result of the valve timing shown in FIG. 3 and is one which produces the optimum torque without any trapping of oil in cells or without any cavitation in cells. Cavitation is defined as a situation wherein a cell is expanding but the valve is closed preventing fluid from entering the expanding cell leaving a void into which fluid under pressure rushes. Trapping may be defined as the occurrence of a cell having its exhaust closed at a time in which the displacement mechanism requires fluid flow from the cell. Cavitation acts to destroy the displacement mechanism and trapping introduces tremendously high forces on the displacement mechanism tending to cause lubrication failure or fatigue of parts. Trapping and cavitation effects have greatly limited the application of fluid operated motors heretofore known. These effects are considerably more pronounced in applications requiring high load capability of the motor.

For purposes of illustration, it may be assumed that backlash, lack of tolerances between moving parts, wear, compressibility of the operating fluid and load on the output shaft causes a retarding of valve member 36 relative to star member 30 and accumulated total of 5°. This may of course, vary depending upon the application of the motor and a calculation may be made to determine the amount of retardation of the valve by any well known method. The effects of retarding the valve 5° relative to the star member are shown in FIGS. 5 and 6. Of course, proper synchronism is lost between valve member 36 and star member 30 and, therefore, the pressure pattern changes as compared to the optimum pattern of FIG. 4. The effects of the improper pressure pattern within displacement mechanism 12 result in trapping and cavitation and corresponding malfunctions within the motor generally and within the displacement mechanism specifically.

FIGS. 5 and 6 show the relation between the valve member and star member for the valve as timed in FIG. 3 but under an operating and loaded condition. Under the assumption above, the valve member is retarded 5° in FIG. 5 and the resulting pressure pattern is shown in FIG. 6. Calling specific attention to cell 34a, in FIG. 6, the trapping effect is shown. Note that for proper operation of the displacement mechanism fluid under high pressure should be provided cells on one side of line of eccentricity 35 and fluid under lower pressure should be exhausted from cells on the other side of line of eccentricity 35. However, cell 34a is shown under the influence of pressurized fluid since it is in fluid communication with slot 40a in valve member 36 and passage 25a in fluid communication with cell 34a. However, star member 30 is rotating in the clockwise direction and cell 34a is beginning to collapse. As shown in FIG. 4, for optimum operation, oil should be exhausted from cell 34a and, therefore, slot 41a should be in fluid communication with passage 25a. The trapping effect in cell 34a becomes most severe when there is no fluid communication and the situation is not alleviated until sufficient fluid communication takes place between passage 25a and valve slot 41a.

Referring now to cell 34d in FIG. 6, the occurrence of cavitation may be shown. Star member tooth 32 is about to leave cell 34d and the cell will then expand. During this expansion, oil should be flowing into cell 34d and, therefore, passage 40c should be in fluid communication with passage 25d allowing oil to flow into cell 34d as the cell expands. The cavitation occurs, and the corresponding damage to the displacement mechanism, at the time of substantial fluid communication between passage 40c, carrying high pressure fluid, and passage 25d in fluid communication with cell 34d. At this time, the oil rushes into cell 34d collapsing the void created by the premature exhausting of the fluid in cell 34d through passage 41d which was retarded relative to passage 25d. The proper connection between passage 41d and passage 25d, preventing cavitation, may be seen in FIG. 3. In FIG. 3, there is an orderly exhausting and almost simultaneous pressurizing of cell 34d preventing the cavitation effects.

Figure 7:
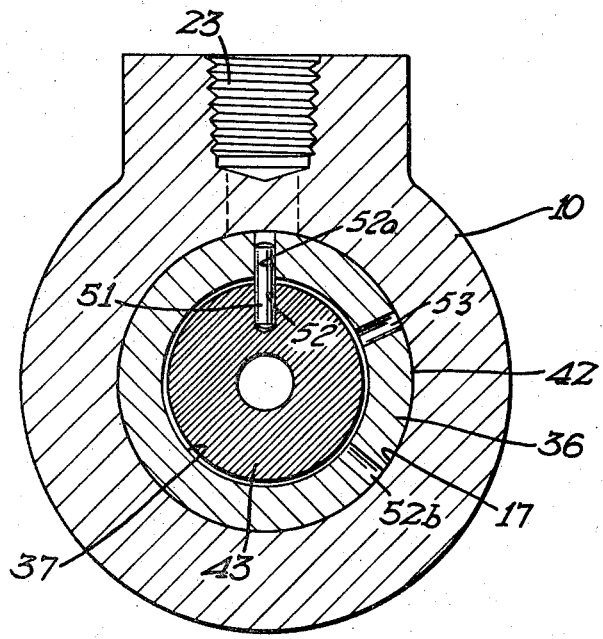
FIG. 7 is a sectional view taken along lines 2—2 but showing a valve setting, capable of compensating for a predetermined condition, at no load orientation.

Referring now to FIG. 7, valve 36 has been advanced 5° to compensate for the 5° losses assumed above by taking pin 51 from slot 53, rotating the valve and pinning it to shaft 43 at valve timing slot 52a. Of course, additional slots similar to slots 52a or 53 may be provided as necessary to compensate for any desired degree of loss. Further, it should be noted that a slot may be provided such as slot 52b for proper timing for the reverse direction of rotation compensating for the 5° loss assumed above. This compensation then provides for a motor having optimum operating characteristics for a given direction of rotation. Of course, if it is desired to have a reversible motor, the motor must be timed symmetrically and pin 51 is placed in valve slot 53. It may be further noted that slots 52a and 53 are 65° apart. This is simply a function of the symmetry of valve 36 and the inadvisability of very closely spaced timing slots. Taking advantage of the symmetry of the valve, the slots may be spaced apart at intervals of 60° plus the correction, for the valve shown herein. Of course, this symmetry changes depending upon the combination of internal and external teeth in the displacement mechanism.

Figure 8:
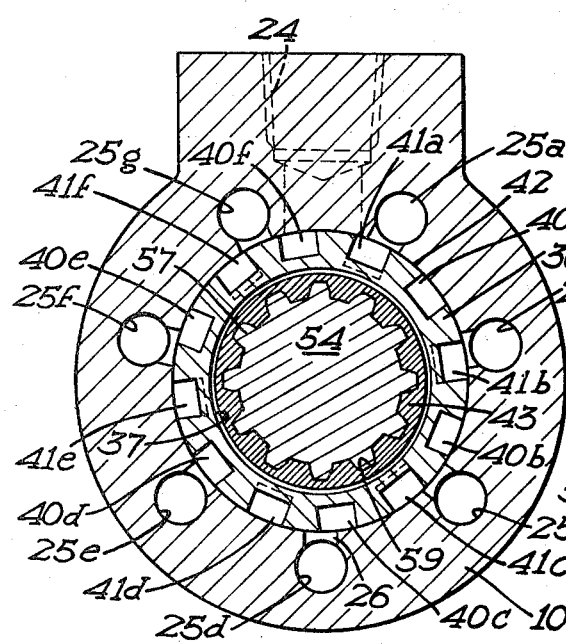
FIG. 8 is a sectional view taken along lines 3—3 of FIG. 1 but showing the corrected valve position under no load conditions. When
Figure 9:
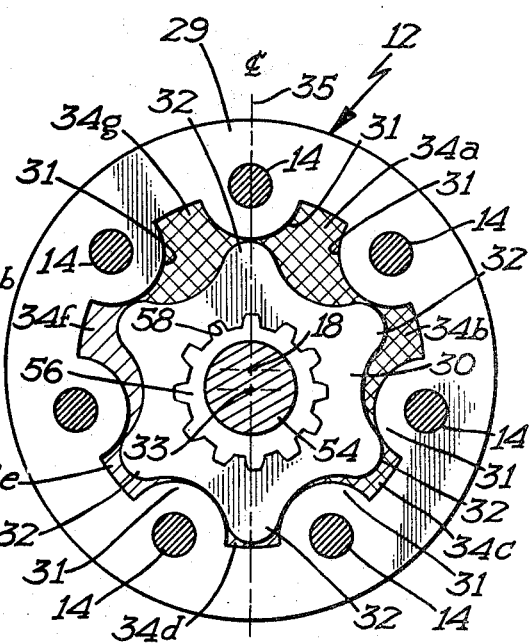
FIG. 9 is a sectional view taken along lines 4—4 of FIG. 1 but showing the displacement mechanism pressure pattern under no load conditions corresponding to the no load valve position of FIG. 8.

FIGS. 8 and 9 show the valve position and the corresponding star member position for the corrected valve member, as shown in FIG. 7, and the corresponding pressure patterns in the displacement mechanism for a no-load condition. It may be noted that the trapping phenomenon is occurring in cell 34d and cavitation is occurring in cell 34g. The trapping occurs because of the premature pressurizing of cell 34d from the early communication of slot 40c with passage 25d carrying fluid under high pressure into cell 34d. The cavitation occurs because of the early termination of fluid communication between passage 40f and passage 25g which is in fluid communication with cell 34g. The early timing, or the 5° advance, now creates a different situation for cavitation and trapping, a situation which does not pose the problems of late timing. Trapping now occurs under a lighter normal load because there is no load on the motor. Cavitation is now followed by exahust communication rather than the pressure communication and consequently cavitation is considerably reduced.

An example of cavitation is found by considering cell 34f. Considering clockwise rotation of star member 30, cell 34f is expanding. Considering now the communication of passage 25f and valve slot 40e, the communication therebetween allowing fluid under pressure to enter cell 34f is terminated early and a void is therefore created. At the point of substantial fluid communication between exhaust passage 41e and passage 25f there is a communication of lower pressure fluid into the void in cell 34f created by early termination of fluid communication between slot 40e and passage 25f. This causes cavitation which is considerably less extreme than the cavitation created by late timing.

Considering cell 34c, trapping is about to take place since the fluid communication between exhaust passage 41c and passage 25c to cell 34c is about to terminate in advance of tooth 32 of star member 30 collapsing the cell without provision for exhausting of oil from the cell because of the early termination of the exhaust connection thereto. The trapping effect is not harmful at a no-load condition and is consequently tolerable during the lightly loaded stages of operation of the motor.

Referring now to FIGS. 3 and 4, it may be considered that the valve timing shown therein corresponds to the timing established in FIG. 7, but at a full load condition, assuming a 5° compensation as discussed above. It should be noted, by referring to FIG. 4, that there are no cells in which trapping will occur and that there are no cells in which cavitation will occur. Therefore, this is the most efficient pressure pattern which can be experienced in a displacement mechanism and it is effected at a loaded condition.

It should be noted that the fluid operated motor described herein may be reversibly operated as a motor as well as operated in either direction of rotation depending upon the circuitry of the installation in which the motor described herein is applied. Further, it should be noted that the motor described herein is usable as a pump by simply putting power into the output shaft and taking the fluid pumped from the proper motor port. Further, it should be noted that air, as well as oil, can be the operating fluid.

From the foregoing, it will be seen that I have provided a fluid operated motor of the axial valve type wherein a valve is provided timeable for optimum operation in either direction of rotation, timeable for optimum operation in a clockwise direction of rotation and timeable for optimum operation in a counter clockwise direction of rotation. Further, I have provided a fluid operated motor having means for timing the valve to compensate for predetermined backlash, wear, lack of tolerance between parts and drive member distortion caused by load on the output shaft.

It will, of course, be understood that various changes may be made in the form, details, arrangement and proportions of the various parts without departing from the scope of this invention.

What is claimed is:
1. A fluid operated motor of the axial valve type, said motor comprising:
   a generally cylindrically shaped frame having a longitudinal axis,
   a gerotor type displacement mechanism mounted in said frame and having an internally toothed ring member having an axis coextensive with the longitudinal axis of said frame and in fixed relation thereto, and an externally toothed star member having at least one less tooth than said ring member and having an axis, said star member disposed eccentrically in said ring member for orbital movement about the axis of said ring member and rotational movement about its own axis in the opposite direction from and at a slower speed than said orbital movement during relative movement between said members,
   an output shaft rotatably mounted in said frame for rotation substantially about the longitudinal axis thereof, said output shaft supported by a forward bearing at the output end thereof, said output shaft having a drive member receiving opening therein generally concentric with the longitudinal axis of said frame,
   a drive member connecting said displacement mechanism with said output shaft, said drive member having a rear star member engaging portion and a front drive member engaging portion providing universal joint means between said output shaft and said displacement mechanism, said drive member transmitting rotational movement of said star member to said shaft in synchronism therewith and cancelling the orbiting movement of said star member relative to said output shaft,
   a valve member rotatably mounted in said frame for rotation about the longitudinal axis thereof, said valve member having a plurality of timing slots therein, and
   a valve member drive mechanism detachably connecting said valve member with said output shaft at a predetermined timing slot of said valve member providing synchronous rotation with said output shaft and said displacement mechanism whereby fluid is provided to and exhausted from said displacement mechanism in a predetermined sequence.

2. The fluid operated motor of claim 1 wherein said valve is concentric with said shaft.

3. The fluid operated motor of claim 2 wherein said valve member drive mechanism comprises a pin projecting radially outwardly from said output shaft into a predetermined timing slot of said valve member.

4. The fluid operated motor of claim 1 wherein said motor is reversible and wherein said valve member includes a plurality of timing slots adapted to detachably receive said valve member drive mechanism in a predetermined slot to provide optimum synchronism between said valve member and said displacement mechanism for a predetermined direction of rotation and at a predetermined load on said motor.

References Cited
UNITED STATES PATENTS

| Re. 25,126 | 2/1962 | Charlson | 91—56(UX) |
| 3,348,493 | 10/1967 | Easton | 103—130 |
| 3,352,247 | 11/1967 | Easton | 103—130 |
| 3,452,543 | 7/1969 | Goff et al. | 91—56(X) |

EVERETTE A. POWELL, JR., Primary Examiner